April 16, 1940.  H. C. BOWEN  2,197,681
FLUID PRESSURE PRODUCING DEVICE
Filed May 12, 1937
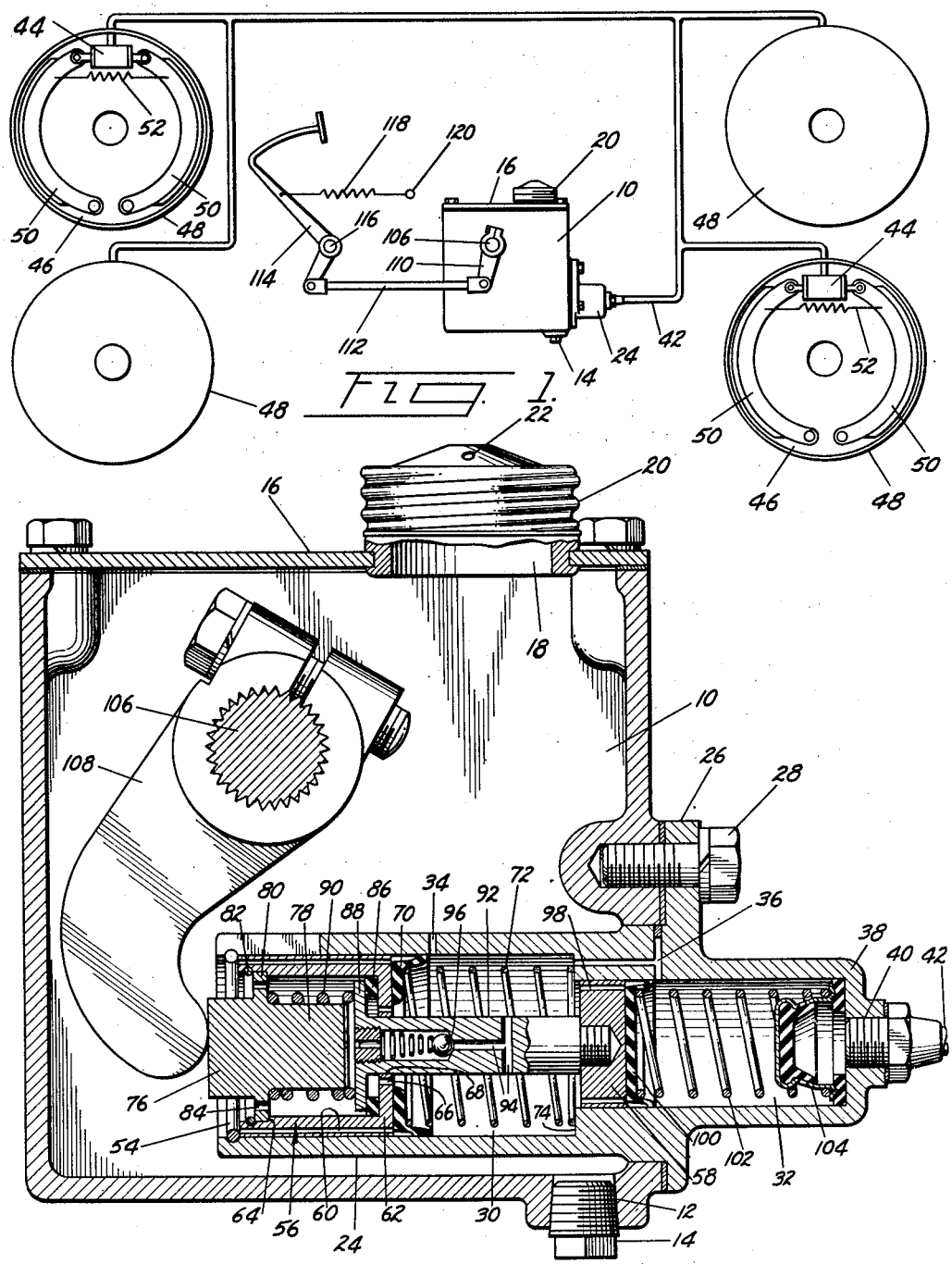
INVENTOR.
HERBERT C. BOWEN
BY
Williams, Bradbury, McCaleb & Hinkle
ATTORNEYS.

Patented Apr. 16, 1940

2,197,681

UNITED STATES PATENT OFFICE 2,197,681

FLUID PRESSURE PRODUCING DEVICE

Herbert C. Bowen, Detroit, Mich., assignor to Hydraulic Brake Company, Detroit, Mich., a corporation of California Application May 12, 1937, Serial No. 142,164

11 Claims. (Cl. 60—54.6)

This invention relates to fluid pressure braking systems, and more particularly to fluid pressure producing devices for such systems.

An object of the invention is to provide a fluid pressure producing device operative to increase pressure without proportionately increasing the applied operating force.

Another object of the invention is to provide a fluid pressure producing device including a low pressure producing means and a high pressure producing means, and means actuated by pressure on the fluid in the device for effecting a gradual transition from low to high pressure.

Other objects and advantages of the invention will appear from the following description taken in connection with the accompanying drawing forming a part of this specification, and in which:

Fig. 1 is a diagrammatical illustration of a fluid pressure braking system embodying the invention; and Fig. 2 is a vertical sectional view of the fluid pressure producing device.

Referring to the drawing, 10 represents a fluid reservoir having a drain opening 12 which may be closed as by a plug 14. The reservoir also has a removable top 16 provided with a filling opening 18 which may be closed as by a cap 20 having suitable openings 22 for venting the reservoir to the atmosphere.

A cylinder 24 fitted snugly in an opening in the wall of the reservoir adjacent the bottom thereof has a radial flange 26 secured to the wall by bolts 28 so as to support the cylinder partly within and partly outside of the reservoir. The cylinder 24 includes a large chamber 30 and a relatively small chamber 32 arranged concentrically to and in communication with the large chamber.

The large chamber has a port 34 providing a communication between the large chamber and the reservoir, and arranged in the wall of the small chamber is a passage 36 providing a communication between the small chamber and the large chamber. The small chamber also has a head 38 provided with a discharge port 40.

A fluid pressure delivery pipe or conduit 42 suitably connected to the discharge port 40 has a plurality of branches connected respectively to fluid pressure actuated motors 44. The motors are arranged in pairs, one pair for actuating brakes associated with the front wheels of a vehicle and another pair for actuating brakes associated with the rear wheels of the vehicle.

The brakes are preferably of conventional type each including a fixed support or backing plate 46 adapted to be secured to an axle or to an axle housing, a rotatable drum 48 associated therewith adapted to be secured to a wheel, a pair of corresponding interchangeable friction elements or shoes 50 pivoted on the backing plate, and a motor corresponding to the motors 44 mounted on the backing plate between the shoes and operative to actuate the shoes into engagement with the drum against the resistance of a retractile spring 52 connecting the shoes.

A compound piston reciprocable in the cylinder 24 is held against displacement by a retaining ring 54 seated in a groove in the wall of the cylinder adjacent the open end of the large chamber 30. This compound piston includes a large piston 56 movable in the large chamber 30 and a relatively small piston 58 movable in the small chamber 32.

The large piston includes a shell having a plurality of passages 60 through its wall providing communications between the reservoir and that portion of the cylinder forward of the piston. The shell has a closed end providing a head 62 and an open end provided with an internal annular shoulder 64. The head has a plurality of spaced ports 66 providing communications between the interior of the shell and that portion of the cylinder forward of the piston, and the head also has an axial opening 68, the purpose of which will hereinafter appear.

A collapsible leak-proof cup 70 seated on the head 62 controls the passages 60. The cap is held against displacement as by a spring 72 interposed between the cup and a shoulder 74 at the junction of the large and small chambers. The spring also serves to assist in returning the piston to its retracted position.

A thrust block 76 mounted in the open end of the shell has a concentric extension 78 having in its face diametral slots. The thrust block also has a radial flange 80 held on the annular shoulder 64 in the open end of the shell by a retaining ring 82 seated in a groove in the wall of the shell, and the flange 80 has a plurality of spaced openings 84 providing communications between the reservoir and the interior of the shell.

A sealing ring 86, of rubber or other suitable material, positioned on the back of the head 62 provides a suitable seat for a valve 88 urged to its closed position by a heavy spring 90 sleeved on the extension 78 of the thrust block between the flange 80 and the head of the valve. The valve has a stem 92 extending through the axial opening 68 in the head 62 into the small chamber 32. A passage 94 through the valve and stem provides a communication between the interior of the shell and that portion of the chamber 30 forward of the piston 56, and a spring-pressed ball valve 96 controls the passage 94.

The piston 58 in the small chamber 32 is suitably secured to the valve stem 92. This piston has passages 98 therethrough providing communications between the large chamber 30 and the small chamber 32. A collapsible leak-proof cup 100 seated on the head of the piston 58 controls the passages 98. The cup is held against displacement by a spring 102 interposed between the cup and a two-way valve 104 seated on the head of the cylinder for control of the discharge port 40. The spring 102 also serves to assist the spring 72 in returning the piston to its retracted position.

A shaft 106 mounted transversely of the reservoir in oppositely disposed walls thereof has keyed thereto within the reservoir an actuator 108 engaging the thrust block 76 and an arm 110 suitably secured to the shaft outside the reservoir is connected as by a rod 112 to a foot pedal lever 114 pivotally mounted as indicated at 116 and connected as by a retractile spring 118 to a fixed support 120.

In a normal operation, upon depressing the foot pedal lever 114 force is transmitted therefrom through the rod 112, the arm 110, the shaft 106, and the actuator 108 to the thrust block 76, resulting in moving the piston on its compression stroke. During the initial movement of the piston on its compression stroke, the cup 70 on the piston 56 covers the port 34, and the cup 100 on the piston 58 covers the passage 36. Thereafter, as the piston advances on its compression stroke the fluid in the cylinder is displaced therefrom past the discharge port 40 and the fluid pressure delivery pipe 42 and its respective branches into the fluid pressure actuated motors 44. This causes actuation of the motors resulting in moving the shoes 60 into engagement with the drums 48 against the resistance of the retractile springs 52 connecting the respective pairs of shoes.

When the pressure on the fluid in the cylinder reaches a predetermined degree slightly in excess of the load on the valve 96, the valve opens. This results in a partial release of the pressure on the fluid in the large chamber 30 of the cylinder and return of a small quantity of fluid from the large chamber to the reservoir by way of the hollow body portion of the piston 56 and the ports 84 in the flange on the thrust block 76. Concomitantly with this operation the cup 100 on the piston 58 seals against the wall of the small chamber 32 and shuts off communication between the small and large chambers, and the pressure on the fluid in the small chamber is received by the small piston 58 without any loss of pressure.

As the piston advances on its compression stroke, the pressure on the fluid in the small chamber is gradually built up, and during this interval the valve 96 maintains a predetermined pressure on the fluid in the large chamber offering a constant resistance to movement of the piston 56. The fluid pressure in the small chamber is received by the heavy spring 90, and upon attaining a predetermined pressure on the fluid in the small chamber sufficient to overcome the load on the spring 90, the valve 88 opens slowly so as to relieve the pressure on the fluid in the large chamber gradually, to the end that a gradually decreasing resistance to the movement of the piston 56 is insured. As the valve 88 opens the fluid in the large chamber is displaced therefrom through the ports 66 in the head 62 of the piston 56, through the piston 56 and the ports 84 in the flange on the thrust block into the reservoir.

Upon completion of a braking operation, the operator releases the foot pedal lever 114, whereupon the retractile spring 118 becomes effective to return the lever to its retracted position. This results in release of the piston and return of the piston to its retracted position under the influence of the springs 72 and 102. As the piston returns to its retracted position, a partial vacuum is created in the cylinder resulting in drawing fluid from the reservoir through the passages 68 in the wall of the piston 56 past the cup 70 into the large chamber 30 and thence through the passages 98 in the piston 58 past the cup 100 into the small chamber 32, completely filling the cylinder.

Simultaneously with this operation, fluid is returning to the cylinder from the fluid pressure actuated motors 44 and the conduits connecting these motors to the cylinder under the influence of the retractile springs 52 connecting the respective shoes of the brake structures. Should the cylinder receive any quantity of fluid in excess of that required to completely fill the cylinder, such excess fluid is returned to the reservoir by way of the compensating port 34 and the by-pass 36.

Although this invention has been described in connection with certain specific embodiments, the principles involved are susceptible of numerous other applications, that will readily occur to persons skilled in the art. The invention is, therefore, to be limited only by the scope of the appended claims.

Having thus described the various features of the invention, what I claim as new and desire to secure by Letters Patent is:

1. A fluid pressure device comprising a reservoir, a cylinder supplied therefrom having a large chamber and a small chamber, a piston reciprocable in the large chamber, a valve in the head thereof for relieving pressure in the large chamber, said valve having a stem extending into the small chamber, a piston on the stem reciprocable in the small chamber, and separate valve means controlling communication between the large cylinder and reservoir and responsive solely to the pressure in the large cylinder.

2. A fluid pressure device comprising a reservoir, a cylinder supplied therefrom having a large chamber and a small chamber, a hollow piston reciprocable in the large cylinder, a valve in the head of the hollow piston, a stem on the valve extending into the small chamber, a piston on the stem reciprocable in the small chamber, a spring for normally holding said valve closed against the force exerted thereon by said small piston, a separate means of passage between said large chamber and said reservoir, and a valve in said last-named passage responsive solely to the fluid pressure in said large cylinder and independent of said other valve.

3. A fluid pressure device comprising a reservoir, a cylinder supplied therefrom having a large chamber and a small chamber, a hollow piston reciprocable in the large chamber, a valve in the head of the hollow piston, a thrust block in the open end of the hollow piston, a spring seated on the thrust block urging the valve to its seat, a stem on the valve extending into the small chamber, a piston on the stem having passages therethrough, means on the piston controlling the passages, and separate valve means controlling communication between the large cylinder and reservoir and responsive solely to the pressure in the large cylinder.

4. A fluid pressure device comprising a reservoir, a cylinder supplied therefrom having a large chamber and a small chamber, a hollow piston reciprocable in the large chamber having passages in its wall providing communications between the large chamber and the reservoir, means controlling the passages, a valve in the head of the hollow piston, a stem on the valve extending into the small chamber, a piston on the stem reciprocable in the small chamber having passages therethrough providing communications between the large and small chambers, means carried by the piston for control of the passages, and separate valve means controlling communication between the large cylinder and reservoir and responsive solely to the pressure in the large cylinder.

5. A fluid pressure device comprising a reservoir, a cylinder supplied therefrom having a large chamber and a small chamber, a hollow piston reciprocable in the large chamber having passages therethrough providing communications between the large chamber and the reservoir, means controlling the passages, a valve in the head of the hollow piston, a stem on the valve extending into the small chamber, said valve and stem having a passage therethrough providing a communication between the large chamber and the hollow piston, a spring-pressed valve controlling the passage, a piston on the stem reciprocable in the small chamber having passages therethrough providing communications between the large and small chambers, and means carried by the piston controlling the passages.

6. A fluid pressure device comprising a reservoir, a cylinder supplied therefrom having a large chamber and a small chamber, a hollow piston reciprocable in the large chamber having passages therethrough providing communications between the large chamber and the reservoir, a collapsible cup controlling the passages, a valve in the head of the hollow piston, a spring in the hollow piston urging the valve to its seat, a stem on the valve extending into the small chamber, said valve and stem having a passage therethrough providing a communication between the large chamber and the hollow piston, a spring-pressed valve controlling the communication, a piston on the stem reciprocable in the small chamber having passages therethrough providing communications between the large and small chambers, and means on the piston controlling the passages.

7. A fluid pressure producing device comprising a reservoir, a cylinder supplied therefrom including a large chamber having a port communicating with the reservoir and a small chamber having a passage in its wall providing a communication between the large and small chambers and a discharge port, a hollow piston reciprocable in the large chamber having passages therethrough providing communications between the large chamber and the reservoir, means controlling these passages, a valve in the head of the large piston, a spring urging the valve to its seat, a stem on the valve extending into the small chamber, said valve and stem having a passage providing a communication between the large chamber and the hollow piston, a spring-pressed valve controlling the passage, a piston on the stem reciprocable in the small chamber having passages therethrough providing communications between the large and small chambers, and means carried by the piston controlling the passages therein.

8. In a fluid pressure system, a fluid pressure producing device comprising a reservoir, a cylinder supplied therefrom including a large chamber opening into the reservoir and having a port communicating with the reservoir and a small chamber arranged concentrically to and opening into the large chamber having a passage in its wall providing a communication between the large chamber and the small chamber and a discharge port, fluid pressure actuated motors operatively connected to the discharge port, a hollow piston reciprocable in the large chamber having passages therethrough providing communications between the large chamber and the reservoir, means on the head of the hollow piston controlling the passages, a valve in the head of the hollow large piston, a spring urging the valve to its seat, a stem on the valve extending into the small chamber, said valve and stem having a passage therethrough providing a communication between the large chamber and the hollow piston, a spring-pressed valve controlling this passage, a piston on the stem reciprocable in the small chamber having a passage therethrough providing a communication between the large and small chambers, means carried by the piston controlling the passages therein, and means for actuating the pistons.

9. A fluid pressure producing device comprising means for creating pressure, including a low pressure producing means and a high pressure producing means, means effective upon attaining a predetermined pressure in the low pressure producing means for sustaining a constant pressure in the low pressure producing means, and means independent of said last-named means and effective upon attaining a greater pressure in the high pressure producing means to relieve the pressure in the low pressure producing means.

10. A fluid pressure producing device comprising means for creating pressure, including a low pressure producing means and a high pressure producing means, means effective upon attaining a predetermined pressure in the low pressure producing means to partially relieve the pressure in the low pressure producing means and thereafter to sustain a constant pressure in the low pressure producing means, and means independent of said last-named means and effective upon increasing the pressure in the high pressure producing means gradually to reduce the pressure in the low pressure producing means.

11. A fluid pressure producing device comprising means for creating pressure, including a low pressure producing means and a high pressure producing means, means effective upon attaining a predetermined pressure in both the low and high pressure producing means for retaining the pressure in the high pressure producing means, means operative simultaneously with the retaining means for relieving the pressure in the low pressure producing means and thereafter sustaining a constant pressure in the low pressure producing means, and means independent of said last-named means and effective upon increasing the pressure in the high pressure producing means to reduce the pressure in the low pressure producing means.

HERBERT C. BOWEN.